United States Patent Office 3,501,323
Patented Mar. 17, 1970

3,501,323
METHOD OF MANUFACTURING BUILDING STRUCTURAL AND PAVING PRODUCTS USING A CALCIUM SILICATE HYDRATE BONDING MATRIX
David R. Moorehead, Elanora Heights, New South Wales, Australia, assignor to The Colonial Sugar Refining Company Limited, Sydney, New South Wales, Australia, a company of New South Wales
No Drawing. Continuation-in-part of application Ser. No. 389,480, Aug. 13, 1964. This application July 9, 1968, Ser. No. 743,330
Claims priority, application Australia, Aug. 19, 1963, 34,332/63
Int. Cl. C04b 7/02; C08h 17/00
U.S. Cl. 106—97                                10 Claims

ABSTRACT OF THE DISCLOSURE

A method of making building, structural and paving products of high compressive strength in which a mixture comprising calcareous material (for example, finely divided hydrated lime), siliceous material (for example, finely divided silica) and water is formed into the shape of the required product and is subjected in that shape to a superatmospheric pressure and a temperature of at least 250° C., the formed product then being returned to atmospheric pressure and ambient temperature, characterized in that the total reaction time at superatmospheric pressure is of the order of half an hour. Compressive strengths which can be achieved by the practice of the invention can be of the order of 20,000 to 30,000 pounds per square inch.

---

The present application is a continuation-in-part of application Ser. No. 389,480 filed Aug. 13, 1964, now abandoned.

This invention relates to the manufacture from calcareous and siliceous materials of building, structural and paving products in which the bonding medium comprises calcium silicate hydrates.

In these types of products, the development of strength (e.g. compressive and tensile) and of other required properties (e.g. porosity, hardness, modulus of rupture and elasticity) depends at least partly on the formation of a polycrystalline matrix of calcium silicate hydrates enveloping the particles of residual siliceous material in the mixture and binding them together in a cemented mass.

The reaction to form such calcium silicate hydrate products is carried out by applying heat to a suitable mixture of calcareous and siliceous materials in the presence of water (hereinatfer sometimes refered to as a "hydrothermal" reaction).

Conventional methods for the manufacture of calicum silicate hydrate products make use of an autoclave treatment of not less than six hours duration at temperatures usually below 220° C. Products which have been made in this way include sand-lime bricks, asbesto-cement type sheets and aerated calcium silicate hydrate blocks.

By way of illustration, a known method of manufacture of asbestos-cement type sheets involves mixing asbestos fibres (usually a blend of different types), calcareous material (usually Portland cement), and silica (usually ground sand) with water to form a free flowing slurry. Proportions by weight of raw materials for a typical mixture may be 15% asbestos blend, 51% Portland cement and 34% ground sand. The asbestos blend may contain amosite, chrysotile and crocidolite mixed in proportions to impart optimum filtering properties to the slurry and suitable strength characteristics to the autoclaved products. The slurry is usually formed into a sheet by a continuous filtering system, and the sheet is then compacted by subjecting it to a "mangle-like" action between rolls. The compacted sheet is trimmed to size and squeezed free of excess water by pressing. It is then cured, usually by autoclaving in saturated water vapour conditions. A typical autoclaving regime requires 2 hours for heating up to 170° C. and 120 pounds per square inch steam pressure, 8 hours holding at this temperature and pressure, and 2 to 3 hours for cooling and gradual reduction of pressure.

Again, it is known to make aerated calcium silicate hydrate bodies from foamed aqueous slurries of finely divided calcareous and siliceous materials at superatmospheric pressure and at temperatures below 220° C.

However, it has not been known hitherto, and it is an object of this inventention, to provide products of high strength in a total autoclaving time of the order of half an hour.

The reaction to form calcium silicate hydrates is known generally to be accelerated markedly by raising the temperature and pressure. It has, however, been found that the degree of strength development achieved by autoclaving for a given period at a given elevated temperature and superatmospheric pressure is not a simple function of the degree to which the reaction is complete. Indeed, since strength development can be attributed significantly to the interlocking of calcium silicate hydrate phases, it is highly dependent on crystallization phenomena occurring and immediately subsequent to the formation of such phases. This is discussed subsequently.

Broadly, the method according to the invention of making building, structural and paving products in which particles of siliceous material are incorporated in a calcium silicate hydrate matrix, comprises making a mixture of calcareous material, siliceous material and water, forming the mixture into the shape of the required product, curing the formed mixture at superatmospheric pressure and at a temperature of at least 250° C. to form by reaction a calcium silicate hydrate coating on residual siliceous material, the proportions of reactants being such as to allow for the presence of said residual siliceous material, the cured product then being returned to atmospheric pressure, said method being characterized in that the total time at superatmospheric pressure is of the order of half an hour.

It will be understood that autoclaving is a treatment under superatmospheric pressure which involves (a) a period of heating to maximum temperature, (b) a period at maximum temperature and (c) a period before the pressure is returned to atmospheric. As hereinatfer explained, the particular autoclaving regime which should be adopted to result in optimum strength for a product must be selected with regard to the materials employed and the desired physical characteristics of that product.

THEORY

It is generally conceded that the poorly crystalline species of calcium silicate hydrate belonging to the tobermorite group are responsible for the main contribution to the hardening process. The formation of calcium silicate hydrate from calcareous material, siliceous material, and water is dependent upon a number of conditions such as temperature, water vapour pressure and the molar proportions of the calcareous and siliceous components which are available for solution It appears that the physical properties generally of a calcium silicate hydrate product are impaired if the period of autoclaving is prolonged beyond a temperature-dependent optimum. The phenomenon of strength impairment, which is most marked at temperatures above 250° C., is attributable in large measure to (i) a gradual recrystallization of calcium silicate hydrate phases to larger crystallite forms having reduced interparticle friction, and may also be attributable partly to (ii) the formation of gaps between siliceous particles and developing calcium silicate hydrate.

General confirmation of this theory in its first mentioned aspect is provided by an examination of surface area data in the following Tables I and II. These results relate to average crystallite surface areas for solid cylinders of one inch diameter and 1.1 inch height (in the case of Table I) and of 0.625 inch diameter and 0.75 inch height (in the case of Table II). For the preparation of these cylinders, crushed quartz (effective surface area of 3,500–4,000 centimetre$^2$/gram) and finely divided hydrated lime were mixed (in proportions of 2:1 by weight) with 8% water (based on dry weight). The damp mix was pressed into cylindrical form by means of a hydraulic press at 10,000 pounds/square inch. The compacted mix was transferred to an autoclave and there heated within 20 minutes (in the case of Table I) or 7 minutes (in the case of Table II) to a maximum curing temperature of 300° C. under saturated water vapour conditions (estimated pressure of 1250 pounds per square inch). Return to atmospheric pressure was effected within 10 minutes (in the case of Table I) or 3–4 minutes (in the case of Table II), by immersing the pressure vessel in an ample supply of running water at room temperature. The cured product was dried finally at 100° C. and had a density of the order 110 pounds/cubic foot. The surface areas given in the tables were determined by nitrogen adsorption (the so-called B.E.T. method).

Compressive strength results show variations within batches as well as between batches. In the case of Tables I and II figures given are an average result for four products.

TABLE I

| Test | Time at 300° C. (max. temp.) (hr.) | Compressive strength (p.s.i.) | Surface area (m.$^2$/g.) | Unreacted components | |
|---|---|---|---|---|---|
| | | | | Hydrated lime, Ca(OH)$_2$ | Silica, SiO$_2$ |
| a | $^1$1 | 23,800 | 36.0 | No | Yes. |
| b | 2 | 23,400 | 30.3 | No | Yes. |
| c | 23 | 20,700 | 21.1 | No | Yes. |
| d | 100 | 18,500 | 19.3 | No | Yes. |

$^1$ Minute

TABLE II

| Test | Time at 300° C. (max. temp.) (hr.) | Compressive strength (p.s.i.) | Surface area (m.$^2$/g.) | Unreacted components | |
|---|---|---|---|---|---|
| | | | | Hydrated lime, Ca(OH)$_2$ | Silica, SiO$_2$ |
| e | 2 | 15,925 | 21.5 | No | Yes. |
| f | 16 | 15,400 | 17.8 | No | Yes. |
| g | 23 | 15,150 | 16.1 | No | Yes. |
| h | 100 | 13,400 | 16.5 | No | Yes. |

From the above, it is seen that there is a tendency for both compressive strengths and crystallite surface areas to decrease as autoclaving times are increased.

Electron micrographs provide confirmation that decreasing surface area may be assigned to recrystallization of calcium silicate hydrate crystallites. Phases formed by an autoclaving regime comprising a very short period at the maximum temperature (c. 1 minute) are amorphous at magnifications of 20,000 diameters, while those formed by an autoclaving regime comprising a long period at the maximum temperature (e.g. 23 hours) show definite crystalline structure.

The data provided in Table III—while not in respect of products prepared according to the defined method of the invention—nonetheless demonstrate strength impairment with increasing period of autoclaving. These results relate to the compressive strengths of five solid cylinders of 0.625 inch diameter and 0.75 inch height, which were prepared from a mixture of crushed quartz (effective surface area 4,700 cm.$^2$/g.) and finely divided hydrated lime (in proportions respectively of 2:1 by weight) with 7% water (based on dry weight). The damp mix was pressed into cylindrical form by means of a hydraulic press at 15,000 p.s.i. The compacted mix was transferred to an autoclave and there heated within 20 minutes to 300° C. under saturated water vapour conditions (estimated pressure of 1250 p.s.i.). The total period of autoclaving at the maximum temperature varied in the five samples between ½ hour and 8 hours. Return to atmospheric pressure was effected within 10 minutes.

TABLE III

| Test | Autoclaving period (hr.) at max. temp. | Compressive strength (p.s.i.) |
|---|---|---|
| i | ½ | 29,839 |
| j | 1 | 22,298 |
| k | 2 | 15,351 |
| l | 4 | 12,404 |
| m | 8 | 14,813 |

The other mentioned contributing cause of strength impairment is the formation of gaps between siliceous particles and developing calcium silicate hydrates.

Evidence relating to the reaction of silica with saturated lime solutions (below the critical point of water) indicates that only the hydrated silica species diffuses through the calcium silicate hydrate product layer (Moorehead, D. R. and McCartney, E. R., "The mechanism of the quartz-lime solution reaction at temperatures up to 500°," Symposium on Autoclaved Calcium Silicate Building Products, S.C.I., 1965). Calcium ions do not appear to migrate through this layer, so that, as the reaction proceeds, a gap of increasing magnitude is formed between the particles of siliceous material and the calcium silicate hydrate product.

As suggested previously, strength development in calcium silicate hydrate products is not a simple function of the degree to which the reaction to form calcium silicate hydrates is complete. Other things being equal, it is indeed quite possible for a product containing unreacted lime to have a higher compressive strength than a product containing no residual lime. Table IV gives test results for solid cylinders containing unreacted lime, prepared from the materials and according to the method described above in relation to Table II. The quantities of residual lime and silica in the finished product were estimated by X-ray diffraction techniques.

Figures given in this table are an average result for four specimens.

TABLE IV

| Test | Time at 300° C. (max. temp.) | Compressive strength (p.s.i.) | Unreacted components | |
|---|---|---|---|---|
| | | | Hydrated lime, Ca(OH)$_2$ percent | Silica, SiO$_2$ |
| n | c. 0 min | 16,300 | 7 | Yes. |
| o | 1 min | 15,275 | 4 | Yes. |

From the above it is clear that the accelerated high temperature curing of calcium silicate hydrate products can be achieved according to the present invention by carefully controlling the period of autoclaving. The economic advantages to be derived from accelerated curing are obvious, but it is also clear that the method imposes its own limitations. These limitations are related to difficulties in cooling products from the maximum curing temperature.

Two factors are of importance. Firstly, non-rapid cooling may lead to strength impairment by the mechanisms mentioned hereinbefore. Secondly, in the case of products of relatively thick section, it is desirable that cooling should take place relatively slowly so as to avoid excessive internal stresses leading to rupture and crack formation. It will be appreciated that the autoclaving regime should be designed accordingly.

While asbestos-cement type sheets with a thickness of 0.25" have been successfully cooled from 300° C. to 100°

C. in four minutes, it has been found necessary to extend the cooling for sheets of 1" thickness to eight minutes so as to avoid rupture.

It will be understood that products of considerable overall thickness (e.g. bricks) may be made by the invention with no sacrifice of compressive strength provided they include suitable holes to permit of rapid cooling without rupture.

With this proviso, examples of the products which can be made according to the invention are sheets (plain or corrugated), blocks, bricks, pipes, guttering, curved and angled sections, beams paving slabs and in fact any product which has been made hitherto using a cementitious material as bonding medium. Some examples of these products are shown in Table V below:

TABLE V (1) Sheets

Flat sheets
Corrugated sheets
Wall tiles
Roofing tiles
Paving slabs and tiles
Panels for exterior & interior sheathing of buildings.

(2) Moulded products

High density structural components:

Blocks
Bricks
Pipes
Beams—prestressed or reinforced
Paving slabs and tiles

Low density products made e.g. by incorporation of light weight aggregate or by foaming:

Blocks
Bricks
Pipes
Paving slabs and tiles
Wall panels non-structural
Sound insulation sheets
Thermal insulation products (3) Extruded products Bricks
Bars
Blocks
I beams
Pipes Paving units suitable for road making and the like can be made in situ or close to the road site by a portable plant using material (e.g. soil, lime, water) which, generally, are available in the locality. For example, products having comparable physical properties to paving concrete have been made according to this invention from soil-lime mixtures by hydrothermal treatment at a maximum temperature of 300° C. for five minutes.

It was a disadvantage that soils having a high organic content required to be pre-treated before they could be used for making cementitious products by methods known to the prior art. This difficulty is substantially overcome by adopting the technique of the present invention-temperatures above approximately 250° C. being adequate to effect at least sufficient decomposition of deleterious organic matter to achieve the object of the invention.

Another advantage arising out of this invention is that in view of the short autoclaving time which is made possible, the operations of forming and reacting which are usually carried out separately can be combined into one operation, as by the use of a hydraulically operated and heated platen press. It is also possible, in using a heated platen press, to release the pressure and eject the moulded product without cooling the platens, thus conserving heat and increasing throughput.

A reduction in production time is also made possible with the use of a continuously operated extrusion die in which the product is substantially simultaneously formed and cured.

RAW MATERIALS

The building, structural and paving products of the invention are prepared from a mixture comprising three essential components (calcareous material, siliceous material, water) and, optionally, certain addenda.

The calcareous component

As used herein "calcareous" material means any calcium-containing material which is reactive with silica under hydrothermal conditions to form calcium silicate hydrates.

Conveniently, the calcareous component consists of lime (CaO) or hydrated lime ($Ca(OH)_2$). A high quality lime having a low magnesium oxide content is desirable; and a lime which meets the A.S.T.M. specification C415–58T is suitable.

Additionally and/or alternatively, the calcareous component can consist of a material other than lime, but which, under the conditions employed, can react with silica to form calcium silicate hydrates.

On this definition, it will be noted that Portland cement falls into the category of calcareous material useful according to the invention. It is also possible to employ a calcareous material which is a mixture of different components (e.g. lime and Portland cement).

The siliceous component

As used herein, "siliceous" material means any silica-containing material which is reactive with hydrated lime under hydrothermal conditions to form calcium silicate hydrates.

The siliceous component can consist of ground quartz, silica sand, sand-stone, diatomite, soil, siliceous clay, mine tailings, fly ash, furnace slag, or any other material which is reactive with hydrated lime under hydrothermal conditions to form calcium silicate hydrates.

Water

The water incorporated in the mixture should preferably be low in organic content; normally, town supply water is suitable. The water can be present as free water, or can be present in the form of a temperature-labile hydrated compound e.g. hydrated lime.

Addenda (1) Natural or synthetic fibrous materials commonly used for reinforcement are generally applicable as reinforcing materials in the products of the invention. Typical such fibrous materials are of asbestos, silica, glass, cellulose and synthetic organic polymers. Preferably, reinforcing fibres should be selected from those which will enhance the modulus of rupture of a calcium silicate hydrate matrix, and will not be brittle under conditions of stress (e.g. conditions of nailing).

Whether or not a fire will enhance the modulus of rupture of the matrix in which it is incorporated can readily be determined by experiment. Thus, when mineral wool (Rockwool) fibres were employed to make reinforced products according to the invention, the resultant products were found to have a very low modulus of rupture or were so brittle that they fractured before their modulus could be determined.

Asbestos fibres show very good compatibility with a calcium silicate hydrate matrix and greatly enhance the strength of the products in which they are incorporated. This can be related to the fact that asbestos occurs naturally in fibre-bundles within which there may be a considerable degree of "slip."

Additional reinforcement can be provided by non-fibrous materials, such as steel rods, metallic mesh or gauze, fine metallic wires.

Various types of additive can be incorporated in the mixture: For example, additives such as surfactants and accelerators can be used to assist in wetting the dry components, to accelerate the hardening process, and if required to facilitate extruding. A useful surfactant is, for example, a sulphonated petroleum derivative. Useful accelerators are calcium chloride and sodium hydroxide, the former increasing the availability of calcium ions in solution and the latter increasing the dissolution rate of silica.

Particle size and proportioning

Preferably the specific surface area of the siliceous material is greater than 1,000 centimeters$^2$/gram, and particularly favoured surface areas are selected within the range 3,000 to 5,000 centmetres$^2$/gram.

In general, it has been found that, as the specific surface area of silicia varies from 1,000 to 12,000 centimetres$^2$/gram, the optimum calcium hydroxide to silica ratio by weight varies substantially linearly from 0.2 to 1.2. Optimum strength products have been made according to the invention using finely divided hydrated lime and silica of surface area 3,500 to 5,000 centimetres$^2$/gram in the proportion by weight of 1:2 (stoichiometric excess of silica).

The proportion of lime also depends on the conditions of treatment; that is a more intensive treatment (longer time and/or higher temperature and water vapour pressure) requires a higher proportion of lime to silica surface because the reaction proceeds to a greater depth on the particles of silica. In high strength products, a dissolution of the silica particles occurs typically to a depth of up to 3 microns.

Where the calcareous material is a mixture, e.g. of Portland cement and lime, the component proportions will naturally be dictated by the desired properties and cost of the product. A strong asbestos cement type product has been made from 10% Portland cement and 30% lime, together with 30% diatomite and 30% amosite, using the method according to the invention.

The proportion of water required depends on a number of factors. For example, in forming the calcium silicate hydrate product from a mixture of lime and crushed quartz, as mentioned above, damp pressing requires approximately 8% water on dry weight of the raw materials. However, in the extrusion processes of forming, 20% to 30% of water on dry weight of the raw materials may be required.

The maximum quantity of water necessary to produce a calcium silicate hydrate product from lime, silica and water is approximately 1 mole of water per 1 mole of calcium oxide. In cases where the reaction vessels have large free volumes, and if saturated water vapour conditions are to be used for the reaction, the quantity of water which must be added will be considerably more than that required on this basis.

Mixing and comminution

The mixing of the component materials can be done in any of a number of ways. For example, the calcareous and siliceous components can be mixed together first and then a quantity of water can be added. When the calcareous component is calcium oxide, its heat of hydration can thereby be preserved and the product will be preheated to some extent before autoclaving. This treatment may also result in a development of desirable "green" strength.

In other cases, where grinding of the siliceous component and/or calcareous component is required, the materials including water can be mixed conveniently in a ball mill.

Forming or moulding

This operation can be done by pressing the component mixture to the required shape (e.g. brick, block, sheet—flat or corrugated) in a hydraulically operated press. For compacting pressures in the range 10,000 to 20,000 pounds per square inch the density of the product is practically independent of compacting pressure variation. Such pressures are accordingly very suitable in practice, where small differences in compacting pressure will not result in non-uniformity of products.

Alternatively—if sufficiently plastic—the component mixture can be extruded (e.g. as pipes, shaped beams, sheets, or as a continuous column from which sections can be cut). Lubricating additives such as hydrated starch or carboxymethylcellulose type derivatives can be included if necessary in the component mixture to make it sufficiently plastic for extrusion forming.

Some examples of the invention are now given.

EXAMPLE A

Compacts of an abovementioned mixture of lime and crushed quartz (detailed under "Particle size and proportioning") were submitted to the following autoclaving regime: heating up to 300° C. over a 10 minute period, 1½ minutes at 300° C. (pressure of approximately 1250 pounds per square inch under saturated water vapour conditions), and return to atmospheric pressure within 3 to 4 minutes (i.e. total autoclaving time of the order of half an hour). The products thus made all had compressive strengths of the order of 20,000 pounds per square inch and were free of surface cracks.

EXAMPLES B

Other examples have been described already in relation to Tables I and IV, and are not here repeated.

EXAMPLES C

The particular examples already detailed employ a maximum autoclaving temperature of 300° C. Tables VI and VII below give data for solid cylinders prepared at maximum autoclaving temperatures other than 300° C. from the materials and according to the method described in relation to Tables I and II respectively. In all these cases the period at the maximum temperature was c. 0 minute. These results relate to solid cylinders of one inch diameter and 1.1 inch height (in the case of Table VI) and of 0.625 inch diameter and 0.75 inch height (in the case of Table VII). For both these tables, the compressive strengths listed are the average of those for four specimens.

TABLE VI

| Test | Max. Temp. (°C.) | Compressive strength (p.s.i.) | Unreacted components | |
|---|---|---|---|---|
| | | | Hydrated lime, Ca(OH)$_2$ | Silica, SiO$_2$ |
| p | 260 | 30,600 | Yes | Yes. |
| q | 270 | 30,200 | Yes | Yes. |

TABLE VII

| Test | Max. Temp. (°C.) | Compressive strength (p.s.i.) | Unreacted components | |
|---|---|---|---|---|
| | | | Hydrated lime, Ca(OH)$_2$ | Silica, SiO$_2$ |
| r | 258 | 20,750 | 7 | Yes. |
| s | 272 | 17,900 | 6 | Yes. |

EXAMPLE D

The following is an example of the preparation of an asbestos-cement type sheet:

The ingredients recited, in the proportions indicated (by weight), were mixed in the presence of water to form a free flowing slurry: (i) 28.3% hydrated lime, (ii) 56.7% crushed quartz of effective surface area 3,500–4,000 centimetre$^2$/gram, (iii) 15% amosite fibres. This was then formed into a sheet by filtration.

The resulting filter cake was pre-pressed at 1,000 pounds per square inch to give a "green biscuit," which was transferred to a heated platen press (gas-sealed conditions). The temperature was raised within ½ minute to about 300° C., the total pressure then being about 2,000 pounds per square inch. After holding 4–5 minutes, the temperature was lowered and the pressure returned to atmospheric within 1½–2 minutes (by water circulating through the platens) and the product released. The sheet was dried at 100° C.

It will be understood that the particular cooling times at superatmospheric pressure which are quoted in this specification are not meant to define limits in the practice of the invention. Such cooling times are not critical, apart from the described qualifications—(i) that it may be desirable to avoid the deleterious effects of prolonged autoclaving at high temperatures and (ii) that, in the case of products of relatively thick section, excessive stresses should not be caused as a result of cooling.

It will also be understood that maximum autoclaving temperatures in excess of 300° C. may be employed in the practice of the invention (e.g. 335° C., 500° C.), however, under these conditions it may be more difficult to control the period of autoclaving and achieve desired crystallite interlocking.

While saturated vapour conditions are convenient and have been used in all the cited examples, it has been found by the inventor that they are not essential to hydrothermal hardening. However, in cases where unsaturated steam is used, longer periods of autoclaving (within the scope of the invention) and/or higher temperatures than those previously exemplified may be needed and may not be harmful. For example, at 300° C. and at an unsaturated steam pressure of 400 pounds per square inch, a 30 minutes autoclaving period may be needed (as against an autoclaving period of, say, 15 minutes for curing the same product in the higher pressure conditions of saturated steam).

In the case of unsaturated steam conditions, prolonged autoclaving is not associated with the same degree of strength impairment as obtains in the case of saturated conditions. This is related to the fact that recrystallization of calcium silicate hydrate phases is not favoured by reduction in the amount of environmental water.

What is claimed is:

1. A method of making building, structural and paving products in which particles of siliceous material are incorporated in a calcium silicate hydrate matrix, comprising making a mixture of calcareous material, siliceous material and water, forming the mixture into the shape of the required product, curing the formed mixture at supratmospheric pressure and at a temperature of at least 250° C. to form by reaction a calcium silicate hydrate coating on residual siliceous material, the proportions of reactants present being such as to allow for the presence of said residual material, the cured product then being returned to atmospheric pressure, said method being characterized in that the total time at superatmospheric pressure is of the order of half an hour.

2. A method according to claim 1 wherein the calcareous material is selected from the group consisting of lime, hydrated lime, Portland cement and mixtures thereof.

3. A method according to claim 1 wherein the siliceous material is selected from the group consisting of ground sand, soil, fly ash and mixtures thereof.

4. A method according to claim 1 in which the mixture includes in addition a reinforcing material.

5. A method according to claim 4 in which the reinforcing material is asbestos.

6. A method according to claim 1 wherein the steps of forming and curing are conducted simultaneously.

7. A method according to claim 1 wherein the steps of forming and curing are conducted in a hydraulically operated heated platen press.

8. A method according to claim 1 wherein the steps of forming and curing are conducted in an extrusion die.

9. A method according to claim 1 wherein curing is conducted at a pressure corresponding to and provided by the saturation vapour pressure of water at the selected temperature.

10. A method according to claim 9 wherein curing is conducted at a maximum temperature of 300° C. and at the corresponding saturated vapour pressure.

References Cited

UNITED STATES PATENTS 3,202,522   8/1965   Yang et al. _____ 106—120

JAMES E. POER, Primary Examiner

U.S. Cl. X.R.

106—98, 99, 118, 120; 264—82